(12) United States Patent
Reddy et al.

(10) Patent No.: US 7,684,074 B2
(45) Date of Patent: Mar. 23, 2010

(54) METHODS AND SYSTEMS FOR IMAGING DEVICE METADATA MANAGEMENT

(75) Inventors: Amarender Reddy Kethi Reddy, Corona, CA (US); Shinichi Yamamura, Irvine, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1158 days.

(21) Appl. No.: 11/255,333

(22) Filed: Oct. 21, 2005

(65) Prior Publication Data

US 2006/0092097 A1     May 4, 2006

Related U.S. Application Data

(63) Continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004.

(60) Provisional application No. 60/704,066, filed on Jul. 28, 2005.

(51) Int. Cl.
*G06F 15/00* (2006.01)
*G06F 15/16* (2006.01)

(52) U.S. Cl. .................................. 358/1.15; 709/203

(58) Field of Classification Search ................. 358/1.15, 358/1.16, 1.18, 1.14, 468, 402, 403; 709/203, 709/205, 218, 208, 223, 249; 707/10, 101, 707/201, 100, 104.1, 202, 204; 715/205, 715/777, 765; 455/74, 414.2, 414.1; 718/1; 370/401, 389, 469; 705/7, 41
See application file for complete search history.

(56) References Cited

U.S. PATENT DOCUMENTS

| | | | |
|---|---|---|---|
| 5,085,587 | A | 2/1992 | DesForges et al. |
| 5,323,393 | A | 6/1994 | Barrett et al. |
| 5,659,845 | A | 8/1997 | Krist et al. |
| 5,671,412 | A | 9/1997 | Christiano |
| 5,699,494 | A | 12/1997 | Colbert et al. |
| 5,717,439 | A | 2/1998 | Levine et al. |
| 5,726,883 | A | 3/1998 | Levine et al. |
| 5,727,082 | A | 3/1998 | Sugishima |

(Continued)

FOREIGN PATENT DOCUMENTS

EP         1160657         12/2001

(Continued)

OTHER PUBLICATIONS

Canon USA, Inc.; MEAP Multifunctional Embedded Application Platform; Aug. 2004; http://developersupport.canon.com/Web_MEAP_Presentation.pdf.

(Continued)

*Primary Examiner*—Saeid Ebrahimi Dehkordy
(74) *Attorney, Agent, or Firm*—Krieger Intellectual Property, Inc.; Scott C. Krieger

(57) ABSTRACT

Embodiments of the present invention comprise systems, methods and devices for imaging device file metadata management.

17 Claims, 16 Drawing Sheets

U.S. PATENT DOCUMENTS

| | | | |
|---|---|---|---|
| 5,745,883 A | 4/1998 | Krist et al. | |
| 5,760,775 A | 6/1998 | Sklut et al. | |
| 5,774,678 A | 6/1998 | Motoyama | |
| 5,799,206 A | 8/1998 | Kitagawa et al. | |
| 5,812,818 A | 9/1998 | Adler et al. | |
| 5,832,264 A | 11/1998 | Hart et al. | |
| 5,877,776 A | 3/1999 | Beaman et al. | |
| 5,956,487 A | 9/1999 | Venkatraman et al. | |
| 5,956,698 A | 9/1999 | Lacheze et al. | |
| 5,968,127 A | 10/1999 | Kawabe et al. | |
| 5,993,088 A | 11/1999 | Nogay et al. | |
| 5,995,553 A | 11/1999 | Crandall et al. | |
| 5,999,708 A | 12/1999 | Kajita | |
| 6,042,384 A | 3/2000 | Loiacono | |
| 6,069,706 A | 5/2000 | Kajita | |
| 6,075,860 A | 6/2000 | Ketcham | |
| 6,118,546 A | 8/2000 | Sanchez | |
| 6,115,132 A | 9/2000 | Nakatsuma et al. | |
| 6,128,731 A | 10/2000 | Zarrin et al. | |
| 6,141,662 A | 10/2000 | Jeyachandran | |
| 6,148,346 A | 11/2000 | Hanson | |
| 6,178,308 B1 | 1/2001 | Bobrow et al. | |
| 6,199,080 B1 | 3/2001 | Nielsen | |
| 6,216,113 B1 | 4/2001 | Aikens et al. | |
| 6,240,456 B1 | 5/2001 | Teng et al. | |
| 6,301,016 B1 | 10/2001 | Matsueda et al. | |
| 6,307,640 B1 | 10/2001 | Motegi | |
| 6,311,040 B1 | 10/2001 | Kucinski et al. | |
| 6,369,905 B1 | 4/2002 | Mitsuhashi et al. | |
| 6,426,798 B1 | 7/2002 | Yeung | |
| 6,433,883 B1 | 8/2002 | Kajita | |
| 6,516,157 B1 | 2/2003 | Maruta et al. | |
| 6,526,258 B2 | 2/2003 | Bejar et al. | |
| 6,567,179 B1 | 5/2003 | Sato et al. | |
| 6,590,673 B2 | 7/2003 | Kadowaki | |
| 6,597,469 B1 | 7/2003 | Kuroyanagi | |
| 6,604,157 B1 | 8/2003 | Brusky et al. | |
| 6,621,422 B2 | 9/2003 | Rubenstein | |
| 6,636,929 B1 | 10/2003 | Frantz et al. | |
| 6,721,286 B1 | 4/2004 | Williams et al. | |
| 6,735,773 B1 | 5/2004 | Trinh et al. | |
| 6,749,434 B2 | 6/2004 | Stuppy | |
| 6,772,945 B2 | 8/2004 | Mahoney et al. | |
| 6,836,623 B2 | 12/2004 | Imai | |
| 6,836,845 B1 | 12/2004 | Lennie et al. | |
| 6,850,252 B1 | 2/2005 | Hoffberg | |
| 6,862,110 B2 | 3/2005 | Harrington | |
| 6,873,429 B2 | 3/2005 | Matsuura | |
| 6,874,010 B1 | 3/2005 | Sargent | |
| 6,915,525 B2 | 7/2005 | Ozawa | |
| 6,934,706 B1 | 8/2005 | Mancuso et al. | |
| 6,940,532 B1 | 9/2005 | Fukui et al. | |
| 6,948,175 B1 | 9/2005 | Fong et al. | |
| 6,951,303 B2 | 10/2005 | Petersen et al. | |
| 6,975,820 B2 | 12/2005 | Wong | |
| 6,999,987 B1 | 2/2006 | Billingsley et al. | |
| 7,013,289 B2 | 3/2006 | Horn et al. | |
| 7,095,513 B2 | 8/2006 | Stringham | |
| 7,107,615 B2 | 9/2006 | Cossel et al. | |
| 7,145,673 B1 | 12/2006 | Lin | |
| 7,162,103 B2 | 1/2007 | Meunier et al. | |
| 7,170,618 B2 | 1/2007 | Fujitani et al. | |
| 7,177,814 B2 | 2/2007 | Gong et al. | |
| 7,181,017 B1 | 2/2007 | Nagel et al. | |
| 7,181,442 B2 | 2/2007 | Yeh et al. | |
| 7,188,181 B1 | 3/2007 | Squier et al. | |
| RE39,808 E | 9/2007 | Motegi | |
| 7,275,044 B2 | 9/2007 | Chauvin et al. | |
| 7,305,616 B1 | 12/2007 | Nelson et al. | |
| 7,327,478 B2 | 2/2008 | Matsuda | |
| 2001/0021945 A1 | 9/2001 | Matsuura | |
| 2001/0027527 A1 | 10/2001 | Khidekel et al. | |
| 2001/0028808 A1 | 10/2001 | Nomura et al. | |
| 2001/0038462 A1* | 11/2001 | Teeuwen et al. | 358/1.15 |
| 2001/0039614 A1 | 11/2001 | Hellberg et al. | |
| 2002/0029256 A1 | 3/2002 | Zintel et al. | |
| 2002/0052916 A1 | 5/2002 | Kloba et al. | |
| 2002/0055984 A1 | 5/2002 | Chang et al. | |
| 2002/0059265 A1 | 5/2002 | Valorose, III | |
| 2002/0089691 A1 | 7/2002 | Fertlitsch et al. | |
| 2002/0099796 A1 | 7/2002 | Chou | |
| 2002/0107939 A1 | 8/2002 | Ford et al. | |
| 2002/0112037 A1 | 8/2002 | Koss | |
| 2002/0120792 A1 | 8/2002 | Blair | |
| 2002/0138279 A1 | 9/2002 | Al-Kazily et al. | |
| 2002/0138666 A1 | 9/2002 | Fujisawa | |
| 2002/0145627 A1 | 10/2002 | Whitmarsh | |
| 2002/0147858 A1 | 10/2002 | Motoyama et al. | |
| 2002/0152235 A1 | 10/2002 | Motoyama et al. | |
| 2002/0152302 A1 | 10/2002 | Motoyama et al. | |
| 2002/0171857 A1 | 11/2002 | Hisatomi et al. | |
| 2003/0007170 A1 | 1/2003 | Kajita et al. | |
| 2003/0011633 A1 | 1/2003 | Conley et al. | |
| 2003/0011640 A1 | 1/2003 | Green et al. | |
| 2003/0014515 A1 | 1/2003 | Motoyama et al. | |
| 2003/0035133 A1 | 2/2003 | Berkema et al. | |
| 2003/0038965 A1 | 2/2003 | Simpson et al. | |
| 2003/0043205 A1 | 3/2003 | Hill | |
| 2003/0043396 A1 | 3/2003 | Klosterman et al. | |
| 2003/0048470 A1 | 3/2003 | Garcia | |
| 2003/0048473 A1 | 3/2003 | Rosen | |
| 2003/0049037 A1 | 3/2003 | Sadowara et al. | |
| 2003/0063313 A1 | 4/2003 | Ito | |
| 2003/0065791 A1 | 4/2003 | Garg et al. | |
| 2003/0084114 A1 | 5/2003 | Simpson et al. | |
| 2003/0088642 A1 | 5/2003 | Price et al. | |
| 2003/0123112 A1 | 7/2003 | Kajita et al. | |
| 2003/0142351 A1 | 7/2003 | Sakura | |
| 2003/0164987 A1 | 9/2003 | Enomoto et al. | |
| 2003/0182632 A1 | 9/2003 | Murdock et al. | |
| 2003/0184552 A1 | 10/2003 | Chadha | |
| 2003/0184590 A1 | 10/2003 | Will | |
| 2003/0184782 A1 | 10/2003 | Perkins et al. | |
| 2003/0188193 A1 | 10/2003 | Venkataramappa | |
| 2003/0225894 A1 | 12/2003 | Ito | |
| 2004/0003341 A1 | 1/2004 | alSafadi et al. | |
| 2004/0012628 A1 | 1/2004 | Kropf et al. | |
| 2004/0012644 A1 | 1/2004 | Allen et al. | |
| 2004/0054573 A1 | 3/2004 | Shah et al. | |
| 2004/0061729 A1 | 4/2004 | Green | |
| 2004/0064759 A1 | 4/2004 | McGuire et al. | |
| 2004/0080771 A1 | 4/2004 | Mihira et al. | |
| 2004/0080778 A1 | 4/2004 | Ito et al. | |
| 2004/0098165 A1 | 5/2004 | Butikofer | |
| 2004/0105104 A1 | 6/2004 | Ishikawa et al. | |
| 2004/0105122 A1 | 6/2004 | Schaeffer | |
| 2004/0109028 A1 | 6/2004 | Stern et al. | |
| 2004/0113941 A1 | 6/2004 | Sliwa et al. | |
| 2004/0117784 A1 | 6/2004 | Endoh | |
| 2004/0125403 A1 | 7/2004 | Furst et al. | |
| 2004/0130744 A1 | 7/2004 | Wu et al. | |
| 2004/0133525 A1 | 7/2004 | Singh et al. | |
| 2004/0161257 A1 | 8/2004 | Ishihara | |
| 2004/0169881 A1 | 9/2004 | Sato | |
| 2004/0179229 A1 | 9/2004 | Laughlin | |
| 2004/0203358 A1 | 10/2004 | Anderson | |
| 2004/0212823 A1 | 10/2004 | Chavers et al. | |
| 2004/0221231 A1 | 11/2004 | Madril et al. | |
| 2004/0223778 A1 | 11/2004 | Zwiefelhofer | |
| 2004/0226993 A1 | 11/2004 | Fulcher et al. | |
| 2004/0227968 A1 | 11/2004 | Nakamura et al. | |
| 2004/0230500 A1 | 11/2004 | Imago | |
| 2004/0236862 A1 | 11/2004 | Ito | |
| 2004/0255263 A1 | 12/2004 | Ando | |

| | | | |
|---|---|---|---|
| 2004/0268306 | A1 | 12/2004 | Cheng et al. |
| 2005/0044248 | A1 | 2/2005 | Mihira et al. |
| 2005/0055475 | A1 | 3/2005 | MacKay et al. |
| 2005/0057560 | A1 | 3/2005 | Bibr et al. |
| 2005/0068581 | A1 | 3/2005 | Hull et al. |
| 2005/0071507 | A1 | 3/2005 | Ferlitsch |
| 2005/0080649 | A1 | 4/2005 | Alvarez et al. |
| 2005/0091087 | A1 | 4/2005 | Smith et al. |
| 2005/0091490 | A1 | 4/2005 | Ogura |
| 2005/0108353 | A1 | 5/2005 | Yamamoto |
| 2005/0114766 | A1 | 5/2005 | Yamamoto |
| 2005/0129423 | A1 | 6/2005 | Lester et al. |
| 2005/0185217 | A1 | 8/2005 | Nishizawa et al. |
| 2005/0223413 | A1 | 10/2005 | Duggan et al. |
| 2006/0007480 | A1 | 1/2006 | Yokokura |
| 2006/0038004 | A1 | 2/2006 | Rielly et al. |
| 2006/0085835 | A1 | 4/2006 | Istvan et al. |
| 2006/0154227 | A1 | 7/2006 | Rossi et al. |
| 2007/0022180 | A1 | 1/2007 | Cocotis et al. |
| 2007/0173266 | A1 | 7/2007 | Barnes, Jr. |
| 2007/0174894 | A1 | 7/2007 | Matsunaga |
| 2008/0072162 | A1 | 3/2008 | Dauerer et al. |

FOREIGN PATENT DOCUMENTS

| | | |
|---|---|---|
| JP | 08234945 | 9/1996 |
| JP | 2002330253 | 11/2002 |
| JP | 2003022258 | 1/2003 |
| JP | 2003050781 | 2/2003 |
| JP | 2003260853 | 9/2003 |
| JP | 2004240752 | 8/2004 |
| JP | 2004310326 | 11/2004 |
| JP | 2005014591 | 1/2005 |
| JP | 2005033460 | 2/2005 |
| WO | WO0118754 A1 | 3/2001 |
| WO | WO0198864 | 12/2001 |

OTHER PUBLICATIONS

Canon USA, Inc.; MEAP: FAQ; accessed on Jul. 2004, pub. date unknown; http://developersupport.canon.com/MEAP.htm.

Xerox, Inc.; Xerox FreeFlow digital workflow collection; 2003; http://www.xerox.com/downloads/usa/en/s/solutions_digital_workflow_whitepaper_sdk.pdf.

Ricoh Company, Ltd.; Ricoh's Medium-Term Management Plan; Mar. 19, 2002; http://www.ricoh.com/IR/data/pre/pdf/ir_pre2002.pdf.

Ricoh Company, Ltd.; White Paper: Embedded Software Architecture SDK; Jun. 25, 2003. http://www.ricoh-usa.com/products/concept/esa.asp?catname=ESA.

Hewlett-Packard Company; JetCAPS Scan2Folder; 2003; http://www.jetcaps.se/resources/datasheets/ds_scan2folder.pdf.

Hewlett-Packard Company; JetCAPS chai applications; Dec. 9, 2002; http://www.stethos.com/chai/data/d_us_chai.pdf.

F.D. Wright, Design Goals for an Internet Printing Protocol, Apr. 1999, pp. 1-43, http://tools.ietf.org/html/rfc2567.

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).

T. Hastings, "Internet Printing Protocol/1.1: Model and Semantics" (Sep. 2000, retrieved from http://www.ietf.org/rfc/rfc291.txt on Sep. 18, 2008, pp. 1-210).

R. Herriot, Internet Printing Protocol (IPP): Event Notifications and Subscriptions, Jun. 21, 2004, http://tools.ietf.org/html/draft-ietf-ipp-not-spec-12, pp. 1-98.

Microsoft Corporation. Microsoft Computer Dictionary, Fifth Edition, 2002 Microsoft Press, pp. 487-488.

Gaedke, Martin et al. "A Modeling Approach to Federated Identity and Access Management", May 2005 ACM.

FOLDOC. "relational database", Jun. 2002, retrieved from <http://foldoc.org/index.cgi?query=relational+database>.

OASIS. "Security Assertion Markup Language (SAML) 2.0 Technical Overview", Working Draft 01, Jul. 22, 2004, <http://www.oasis-open.org/committees/documents.php?wg_abbrev=security>.

Hartman, Bret et al. Mastering Web Services Security, 2003 Wiley Publishing, Inc., pp. 36-46.

U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.

* cited by examiner

METHODS AND SYSTEMS FOR IMAGING DEVICE METADATA MANAGEMENT

RELATED REFERENCES

This application is a continuation-in-part of U.S. patent application Ser. No. 10/962,248, entitled "Methods and Systems for Imaging Device Remote Application Interaction," filed on Oct. 8, 2004; this application is also a continuation-in-part of U.S. patent application Ser. No. 10/961,793, entitled "Methods and Systems for Imaging Device Remote Form Management," filed on Oct. 8, 2004; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Remote document Management," filed on Oct. 8, 2004; and this application is also a continuation-in-part of U.S. patent application Ser. No. 10/962,103, entitled "Methods and Systems for Imaging Device Document Translation," filed on Oct. 8, 2004; this application also claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for imaging device metadata management.

BACKGROUND OF THE INVENTION

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Embodiments of the present invention comprise methods and systems for imaging device metadata management.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
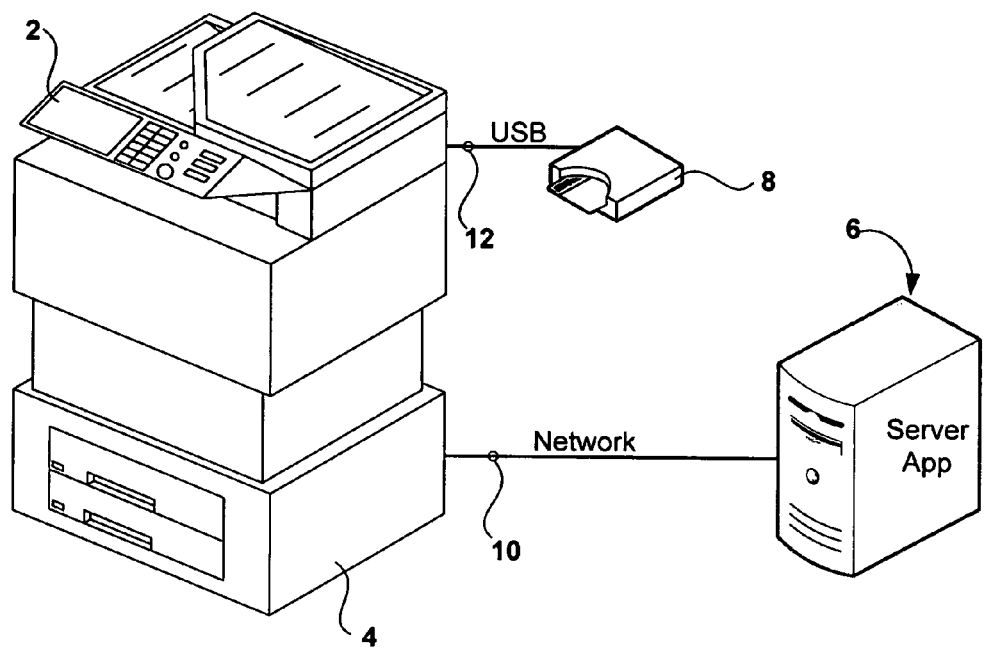
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
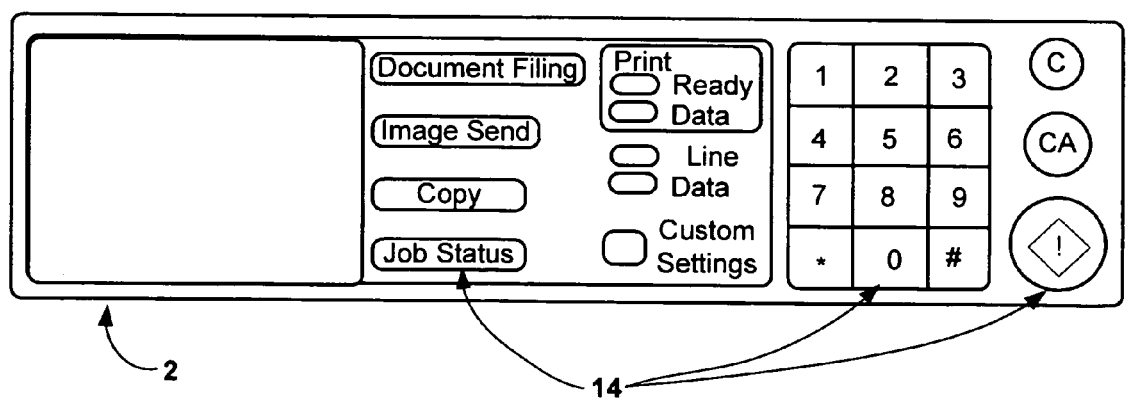
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

| Enable/Disable | Device Functions Description |
|---|---|
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
|---|---|---|---|---|---|---|---|
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide a remote computing device with the following controls:

Mass storage control—an RCD application can retrieve mass storage status information including storage capacity, space available, and write-protect mode plus modify write-protect status.

Resource list—an RCD application can retrieve a list of stored fonts and forms including font or macro ID, font number, font/form name, escape sequence, and file size.

Download resource—an RCD application can download PCL fonts, PCL macros, and PS fonts and forms. Any special processing that is performed when a resource is downloaded via the web pages will also be performed when the resource is downloaded via Open Systems.

Delete resource—an RCD application can delete any resource stored in mass storage.

Upload resources—an RCD application can upload an individual or all resources. On devices where effective memory management is unavailable, a server application can use this function to "defrag" mass storage.

Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application can retrieve the current firmware version numbers.

Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update firmware—an RCD can download an updated firmware version to the device. If a reboot is necessary, the IDev will perform it automatically when download is complete.

Download status—the IDev will send a status notification (success/error) to an RCD after firmware download.

Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application can get and set values for the following scan and fax parameters:

COLOR OR B/W

IMAGE MODE—TEXT, TEXT/PHOTO, PHOTO; EXPOSURE LEVEL

RESOLUTION

FILE FORMAT—FILE TYPE, COMPRESSION, AND PAGES PER FILE

ORIGINAL—ORIGINAL SIZE, SIMPLEX/DUPLEX, ROTATE, AND JOB BUILD

FILENAME

SUBJECT

MESSAGE

SENDER

SCHEDULE SEND TIME

PAGE DIVISION (BOOK SCANNING)

COVER PAGE

TRANSMISSION MESSAGE (CONFIDENTIAL, URGENT, ETC.)

THIN PAPER SCANNING

DESTINATION

DOCUMENT FILING

Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application can get and set values for the following copy parameters:

COLOR OR B/W

EXPOSURE—TEXT, TEXT/PHOTO, PHOTO, SUPER PHOTO; EXPOSURE LEVEL

PAPER SELECT (BY TRAY)

COPY RATIO

2-SIDED COPY-1TO1, 1TO2, 2TO2, 2TO1; BINDING EDGE

OUTPUT—OUTPUT TRAY, SORT, STAPLE, GROUP, OFFSET

ORIGINAL SIZE

SPECIAL FUNCTIONS—MARGIN SHIFT, ERASE, PAMPHLET, ETC.

DOCUMENT FILING

Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:

EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT

Initiate Print—the remote computing device application can select a stored file and initiate a print including the following parameters:

PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING

Initiate Send—the remote computing device application can select a stored file and initiate a send including the following parameters:

RESOLUTION
FILE FORMAT
DESTINATION
TIMER
SENDER
FILENAME
SUBJECT
MESSAGE

Security

Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
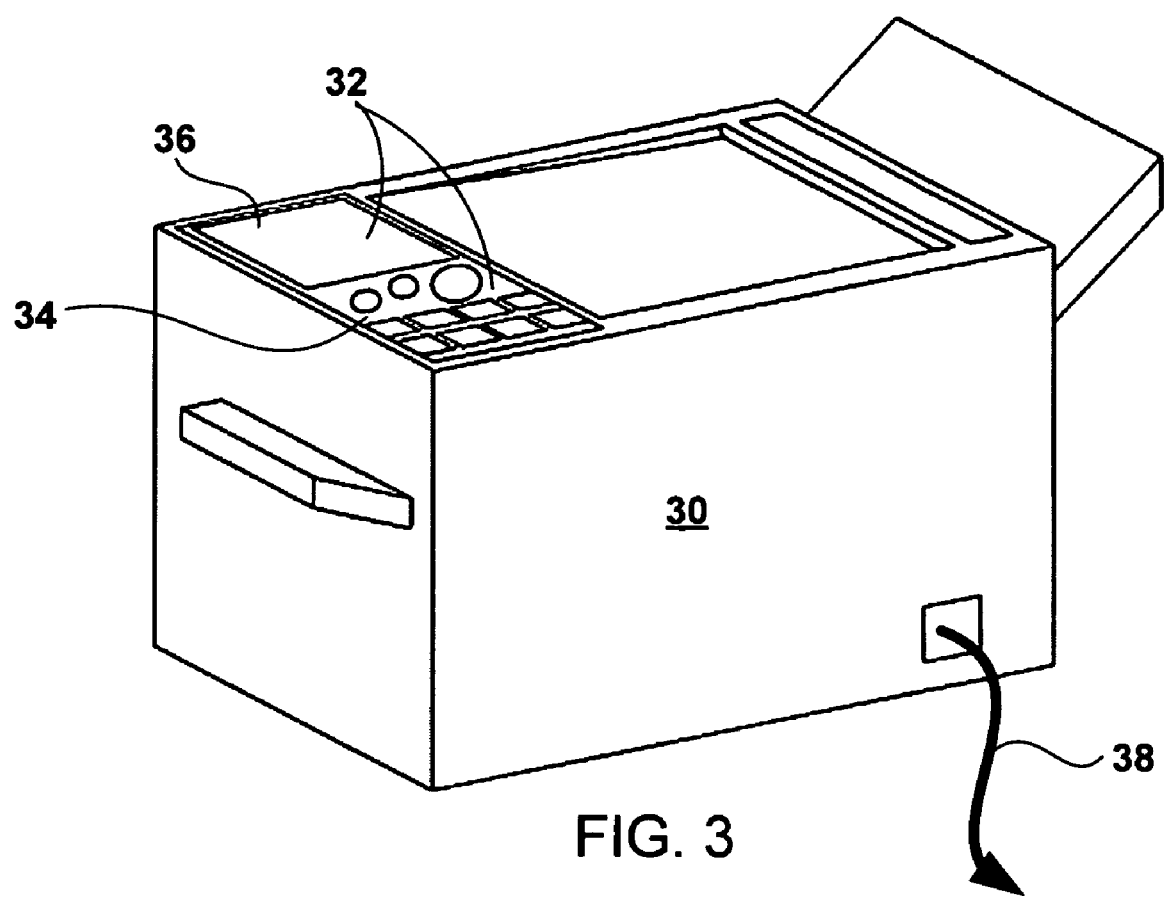
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11 (b) compliant connection, a Bluetooth connection, an Infrared Data Association (IrDA) connection or some other wireless connection.

Figure 4:
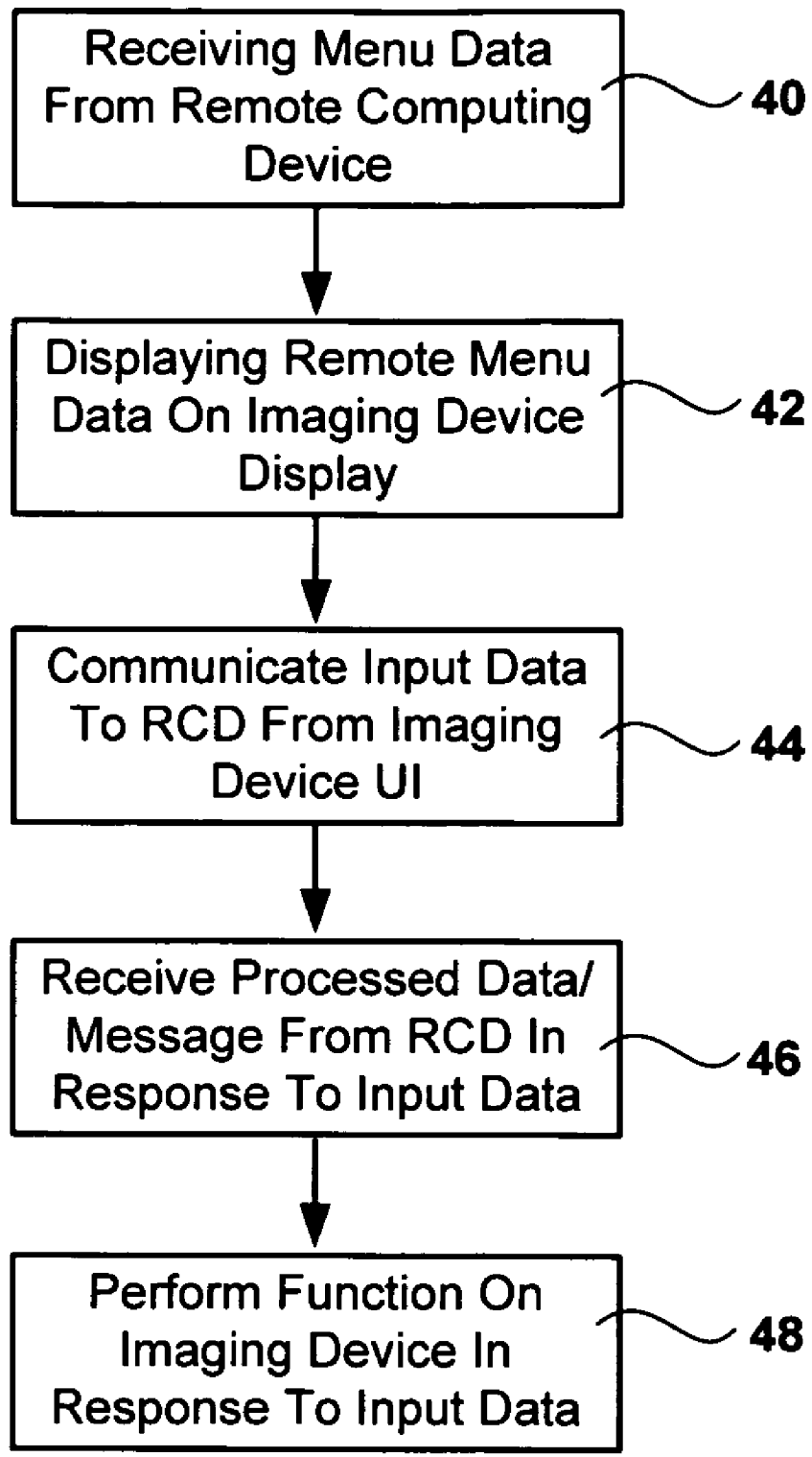
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
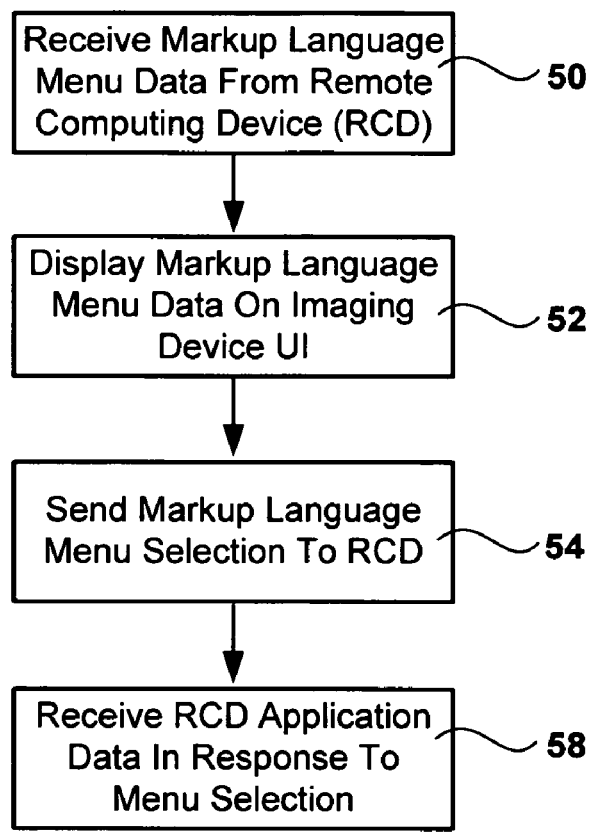
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received through its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
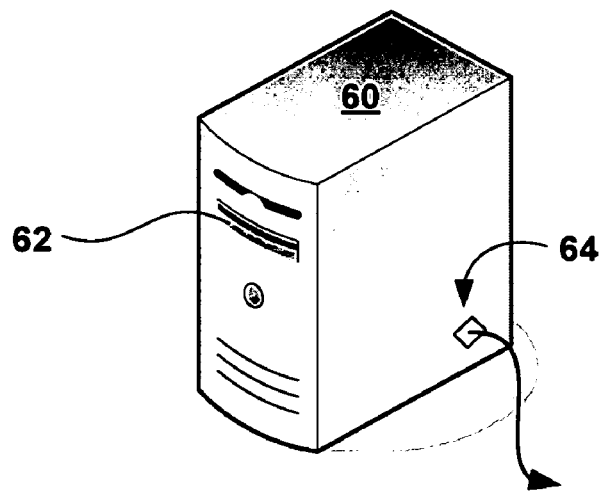
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
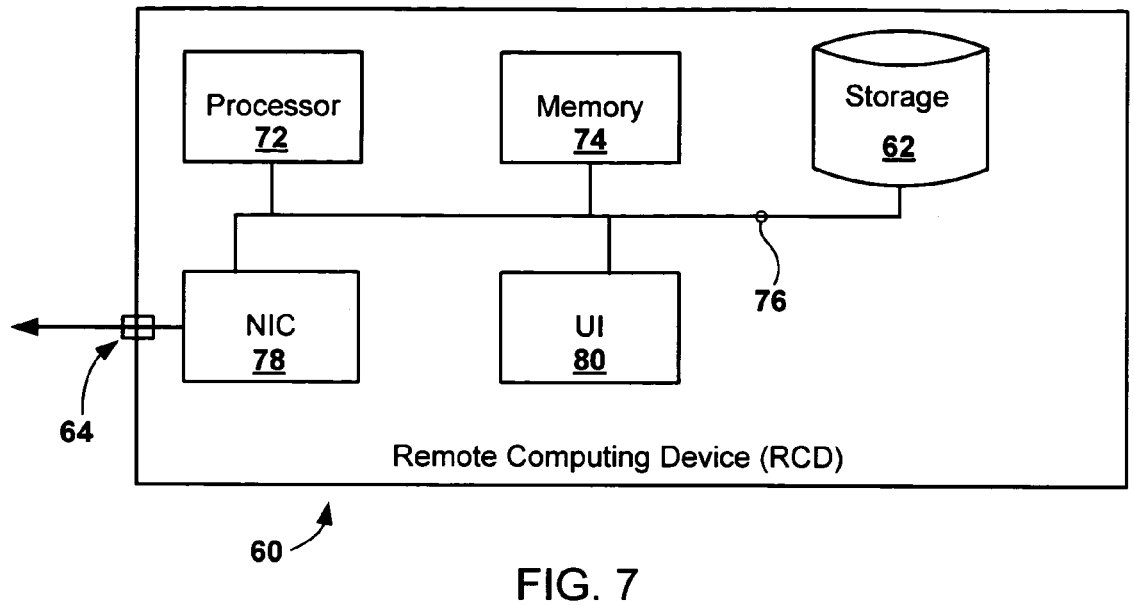
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
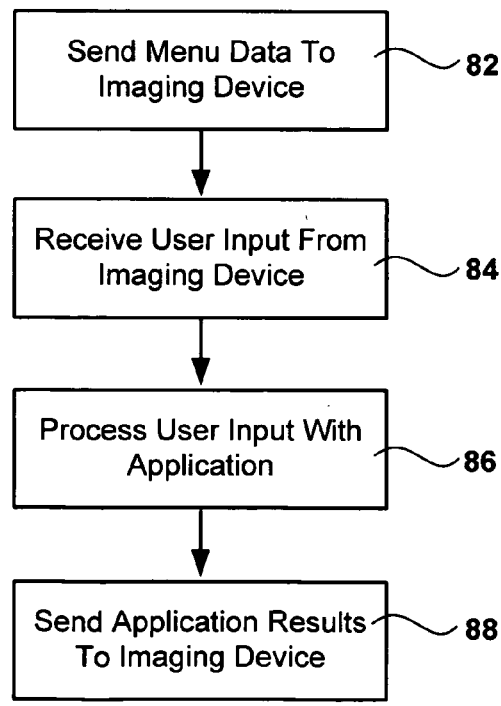
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
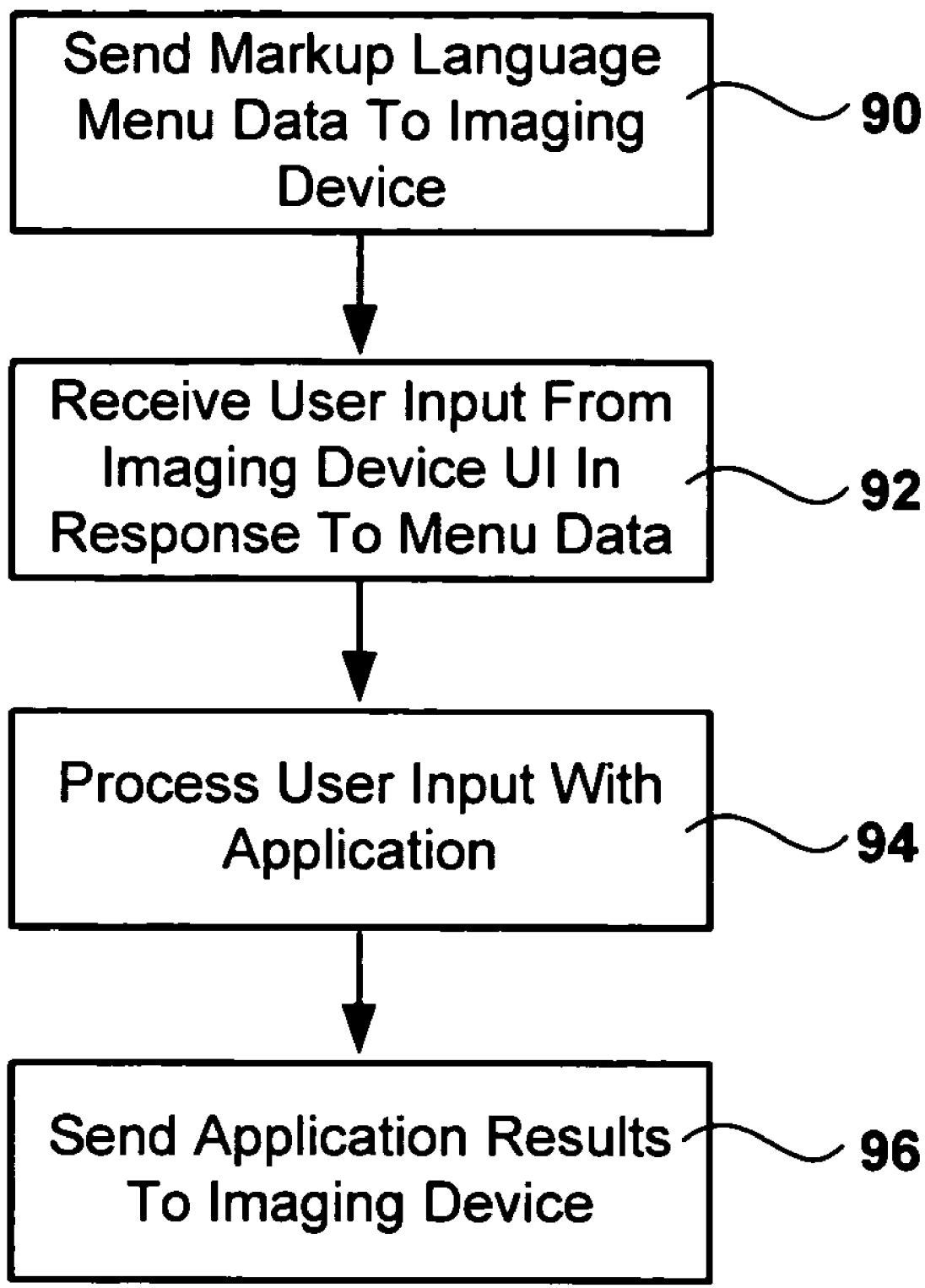
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
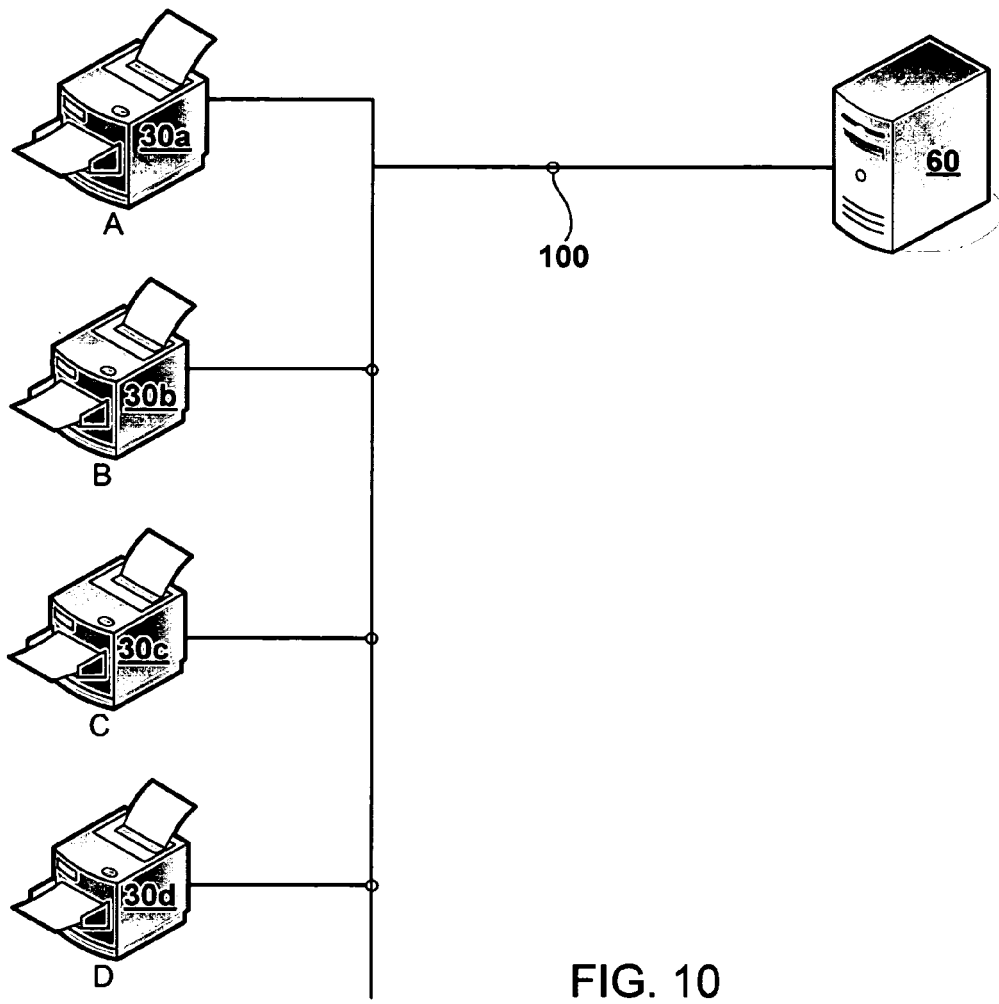
FIG. 10 is a diagram showing a system comprising multiple imaging devices in connection with a remote computing device.
Figure 11:
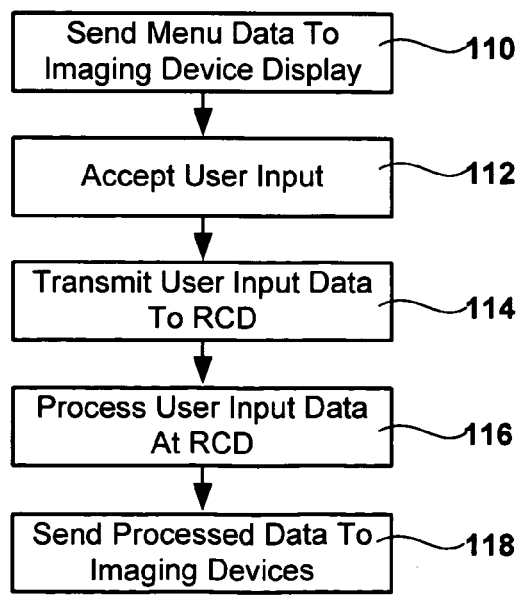
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30a-30d. In these embodiments, at least one of the imaging devices 30a-30d comprises a user interface 32 with a display 36 and user input panel 34 that is integral with the display (i.e., touch-screen) or a separate input unit. RCD 60 is connected to imaging devices 30a-30d by a communications link and network 100 to enable data transmission between RCD 60 and imaging devices 30a-30d.

In these embodiments, menu data is stored on RCD 60 and sent 110 to at least one of the imaging devices 30a-30d where the menu data is displayed on a user interface. Any of Imaging devices 30a-30d that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30a-30d.

In these embodiments, a single RCD 60 may be used to provide processing power, resources and functionality to a plurality of imaging devices 30a-30d without reproducing these resources in each imaging device. In some embodiments, data generated by input on one imaging device 30a may be directed to another imaging device 30d for processed data output or final processing.

Figure 12:
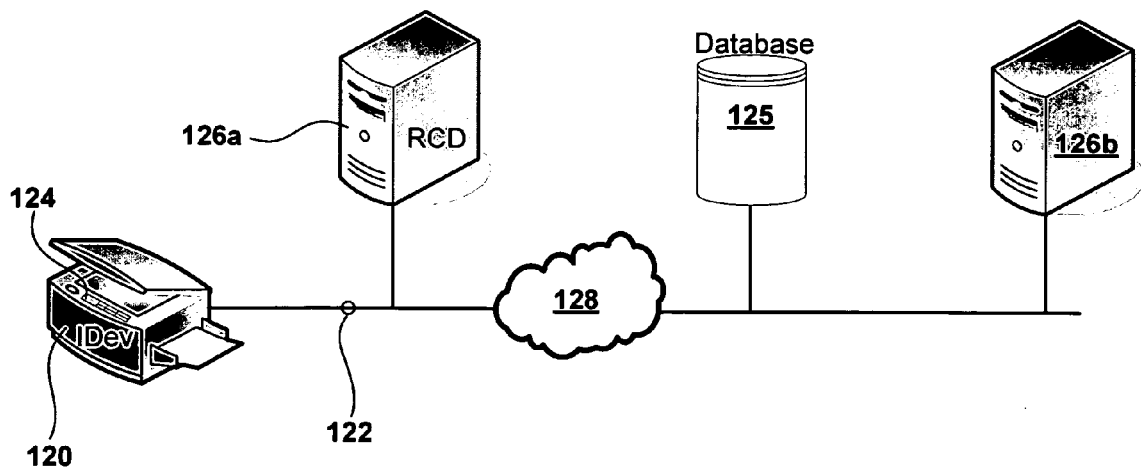
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 will typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126a, 126b, such as a server. The RCD 126a, 126b may be used to store documents, such as forms, and other data and make that data accessible from the imaging device 120. The RCD 126a, 126b may also execute applications that interact with or receive input from the imaging device 120 and its user interface 124. In some embodiments, a database 125 may be linked to the imaging device 120 and/or an RCD 126a, 126b. In some embodiments, an RCD 126b or database 125 may be connected to an IDev 120 over a wide area network such as the internet 128.

Imaging Device Metadata Management Embodiments

Some embodiments of the present invention comprise metadata management functions. Some of these embodiments may provide for user input of metadata at an imaging device user interface (UI). In some embodiments, this metadata may be associated with a file produced on, received by or manipulated by the imaging device. Metadata structure and formatting may be configured by a user and this configuration may be associated with a file folder, a document management system (DMS) folder or some other file organization entity.

In some embodiments, an imaging device may receive a metadata configuration from a DMS and prompt a user to enter appropriate data to populate the DMS metadata fields. The entered data may then be passed to the DMS and associated with the appropriate file or files. Some embodiments may be used in conjunction with Microsoft® SharePoint™ and other DMSs.

Some exemplary embodiments of the present invention may be described with reference to FIG. 13. In these embodiments, a file folder structure 134 exists on a storage device. In a typical structure, folders may be "nested" in a tree structure wherein "child" folders 132 are nested within parent folders 131, which may, in turn, be nested in higher-level, parent or ancestor folders 130. A folder holding a nested, child folder may be referred to as an ancestor folder.

A folder may also comprise files. In some embodiments, a folder may comprise a metadata configuration file 133A-133C. This file may be used to configure the metadata that is associated with files stored in the folder. In some embodiments, when a metadata configuration file is not found in a particular folder, a metadata configuration file found in an ancestor folder may be used for a child folder.

In some exemplary embodiments, an imaging device may be used to create a scan file, receive a file by fax or other transmission method or otherwise manipulate a file. The file may then be stored using a DMS or some other system. At some point in the file manipulation process, a user will be prompted for a file destination and the user will respond by selecting a file folder 130, 131, 132. Once the folder selection is made, embodiments of the present invention may access the folder and determine whether a metadata configuration file 133A-133C is present in the destination folder. If a configuration file is present, it may be used to determine a metadata format to be associated with the file. If a configuration file is not present in the destination folder, ancestor folders may be accessed until a configuration file is located.

When a metadata configuration file (MCF) is found, the MCF may be used to identify metadata fields to be associated with a file and the configuration of the fields. This information may be used to prompt a user at the imaging device UI for data related to the fields. When this data is entered at the UI, the data may be sent to the storage device and stored along with the associated file. In some embodiments, the metadata may be stored as part of a DMS folder. In some embodiments, the metadata may be stored as a separate file that is related to the main file.

Figure 13:
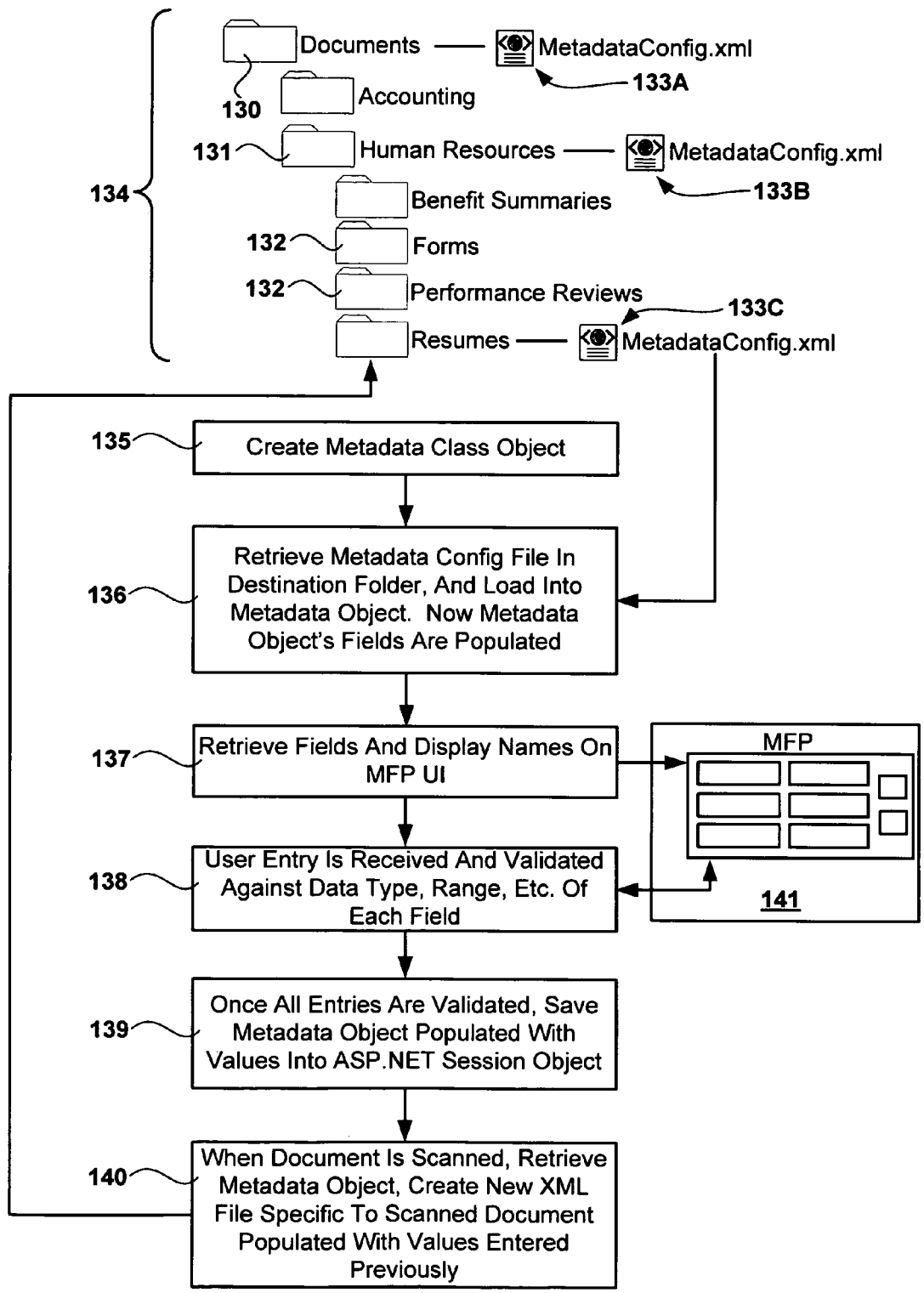
FIG. 13 is a diagram showing steps of an embodiment comprising a metadata configuration file stored in a folder.

In some exemplary embodiments of the present invention, as illustrated in FIG. 13, an imaging device may be used to create or otherwise manipulate a file. Typically, a user will select a file folder 130, 131, 132 for storage of the file. When the folder is selected, the system may create 135 a metadata class object that may be used to prompt a user for metadata input. Once the folder is selected, the system may search the folder and its ancestors for an MCF to determine 136 the metadata fields and configuration appropriate for the folder. This configuration data may then be loaded into the metadata class object to populate the object's fields and otherwise configure the object for the particular folder selected by the user. The configured object may then be displayed 137 to a user at an IDev UI 141 to prompt for folder-specific metadata input.

User input in response to the prompt may be accepted 138 at the IDev UI. In some embodiments, this input may be validated based on data stored in the MCF. Once the user input has been received and any validation or other processing is performed, the metadata may be stored 139. In some embodiments, a metadata object may be populated with values and saved as an ASP.NET session object. In some embodiments, metadata may be acquired automatically without user action.

When the base file is scanned or otherwise manipulated with the IDev and is ready for storage, the metadata object may be retrieved and used to create a file that is related to the base file. In some embodiments, an XML metadata file may be created 140 and stored with the base file. Other file formats may also be used. When the base file format permits, the metadata may be integrated into the base file or its folder.

An MCF may also comprise instructions to obtain metadata by means other than user input at the IDev UI. In some embodiments, the DMS or an associated system may obtain metadata from a linked database, from a linked device, from the IDev with an automated process or by other means.

In some embodiments, an MCF may comprise validation information for one or more metadata fields identified in the MCF. Validation information may comprise a data type validator, a data range validator, or another validator or validation parameter. In some embodiments, metadata may comprise a text field, a numerical field, a date field, a Boolean operator field or another field type.

Figure 14:
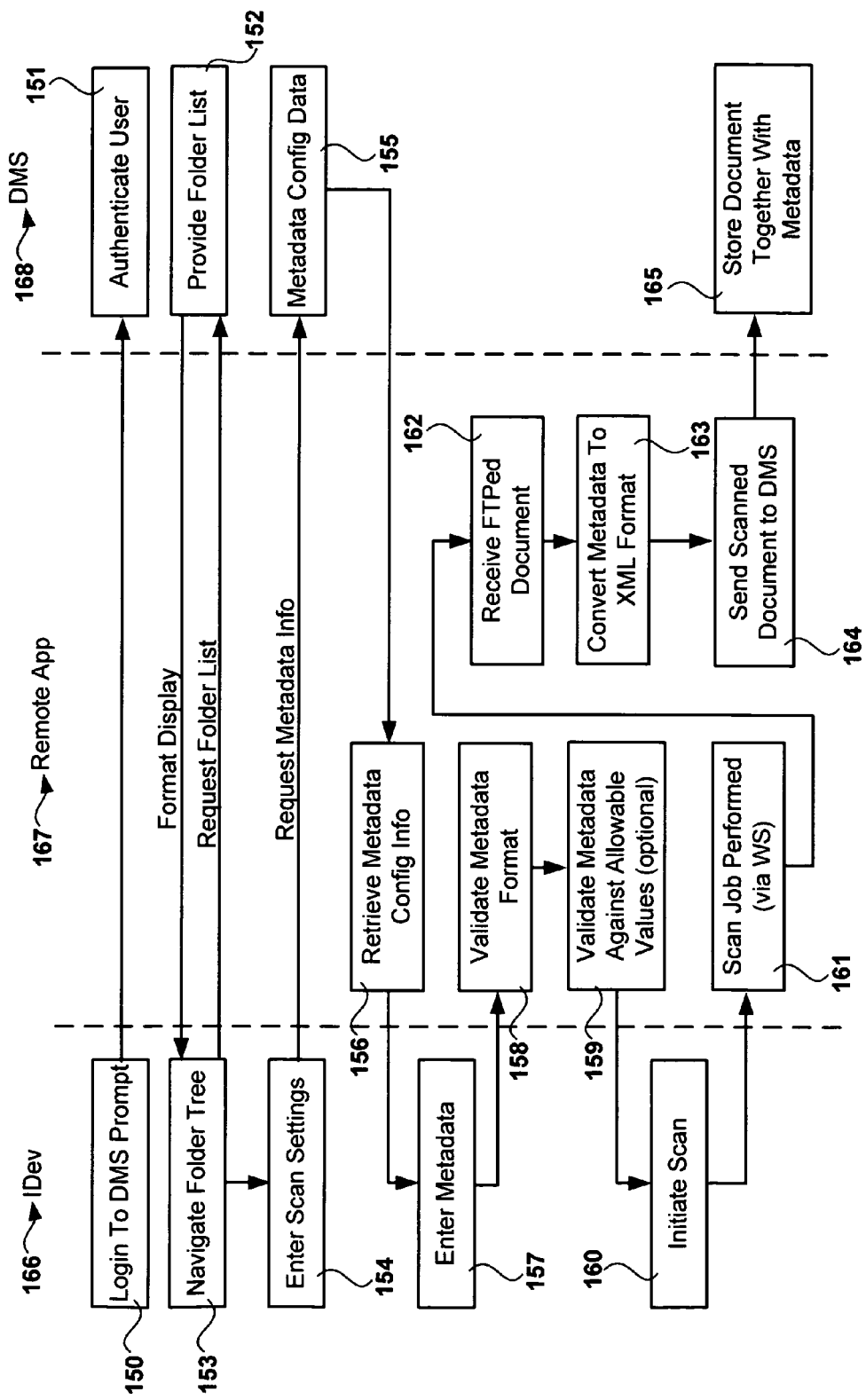
FIG. 14 is a chart showing steps of an embodiment comprising an imaging device interacting with a document management system and a remote application.

Some exemplary embodiments of the present invention may be described with reference to FIG. 14. In these embodiments, an IDev 166 may interact with a Document Management System (DMS) 168 and a remote application 167. User login information may be received 150 at the IDev UI and sent to the DMS 168 or to an authentication application for authentication of the user. Once a user has been authenticated, the DMS may provide 152 a list of folders that are accessible to the user. This list may be transmitted to the IDev UI and displayed to the user. The user may then navigate 153 the folder data, which may require further communication with the DMS to display nested folders, files and other data. Through navigation and selection at the IDev UI, a user may select a destination folder for a file. A user may also input or select 154 scan settings or file configuration options at the IDev UI. This setting and configuration data may be transmitted to the IDev.

Once destination and configuration data have been identified, an IDev may request metadata information 155 from the DMS 168. The DMS 168 may then invoke a remote application 167 to retrieve metadata configuration information. Metadata configuration information may be retrieved 156 from a metadata configuration file (MCF). The MCF may be accessible to the remote application 167, the DMS 168 and the IDev 166. The MCF may comprise metadata field data and field parameter data as well as other information. Data in the MCF may be used to populate prompts on the IDev UI. In response to these prompts, a user may input 157 metadata values at the IDev UI.

In some embodiments, these metadata values may then be sent to the remote application 167 for validation 158. Metadata values may be validated 159 by verifying that the input data complies with field type and value range constraints as well as by other methods.

In an exemplary scan job scenario, a scan may be initiated 160 at the IDev. Elements of the scan job may be implemented 161 by a remote application, such as a Web Service. The scan file may then be sent, such as by FTP, and received 162 at an element of a remote application 167 along with the metadata information. The metadata may then be converted 163 to a file format, such as an XML file that is linked to the scan file. The scan file and its associated metadata file may then be sent 164 to the DMS 168 for storage 165 in the folder selected by the user.

Figure 15:
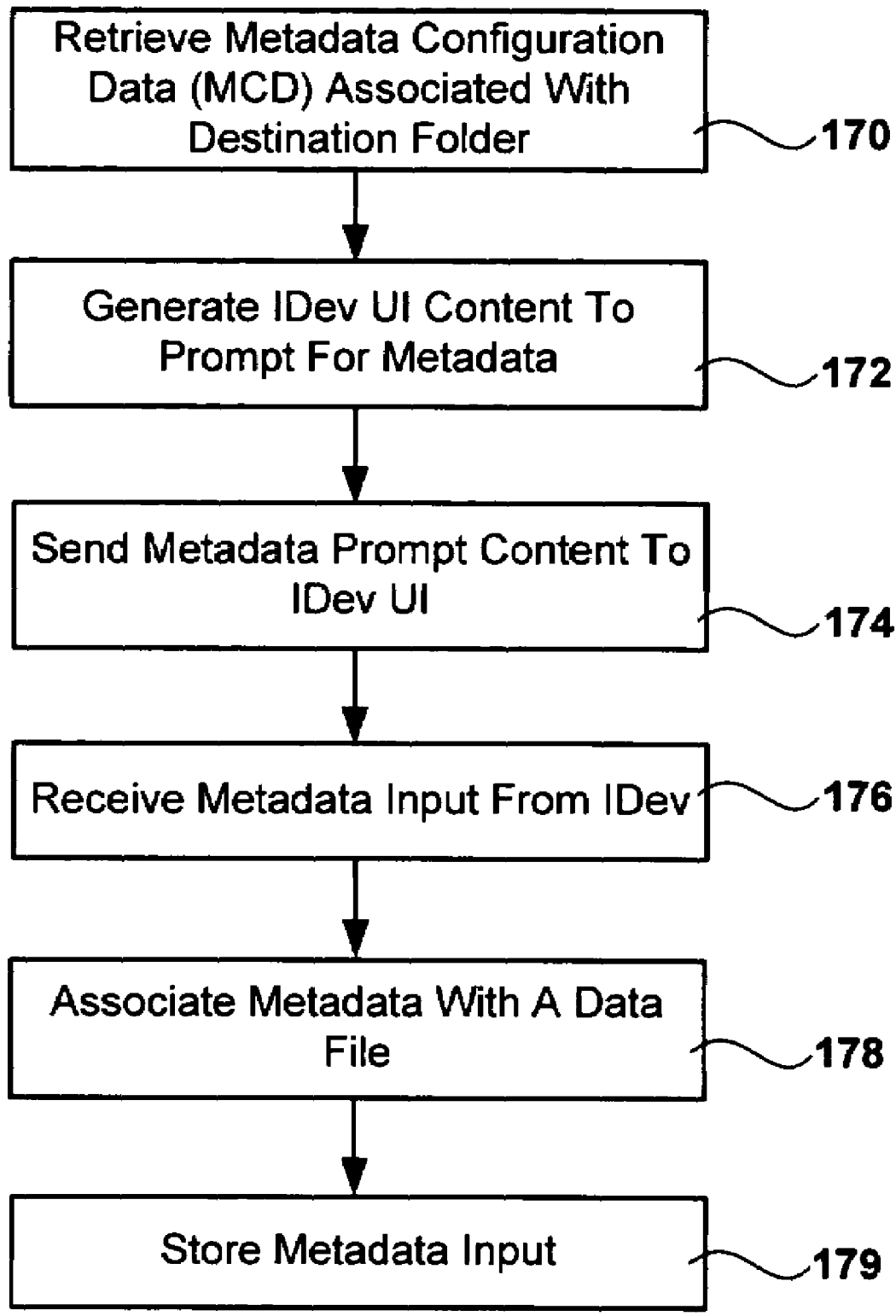
FIG. 15 is a chart showing steps of an embodiment comprising a metadata management application retrieving metadata configuration data (MCD) that is associated with a destination folder.

Some embodiments of the present invention may be described with reference to FIG. 15. In these embodiments, a metadata management application may retrieve 170 a metadata configuration file (MCF) that is associated with a destination folder. The destination folder may be selected by a user in a previous operation, automatically selected by a system or otherwise selected. Using information in the MCF, the metadata management application may generate 172 display content for prompting a user to input metadata corresponding to fields indicated in the MCF. This prompt display content may be sent 174 to the IDev for display. Once metadata input has been input at the IDev UI it may be sent to the metadata management application where it is received 176 and associated 178 with a data file. In a typical scan operation, the metadata is associated with the scanned image file. The metadata is then stored 179. In some embodiments, the metadata may be stored in a file that is separate from the data file, but associated therewith. In some embodiments, these associated files may share a common file name element. In some embodiments, the metadata may be stored as part of the data file or the folder in which the data file resides.

Figure 16:
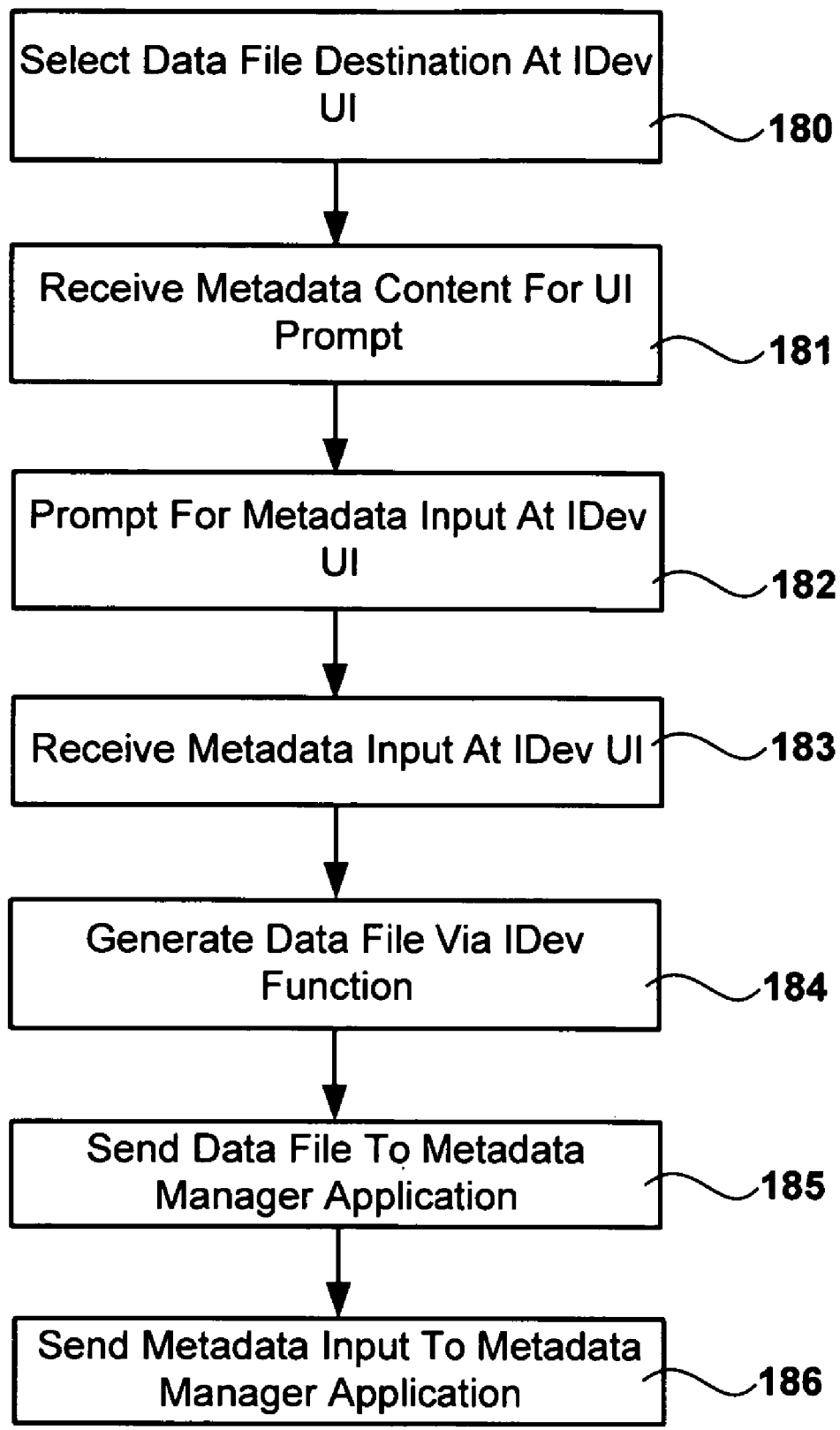
FIG. 16 is a chart showing steps of an embodiment comprising prompting a user for metadata input.

Some embodiments of the present invention may be described with reference to FIG. 16. In these embodiments, an IDev UI may receive a selection 180 of a data file destination. This may be received in conjunction with a scan job request or some other function that comprises storing a data file. Once the destination file folder is identified, the IDev may receive 181 display prompt content for prompting a user to input metadata that is specific to the destination folder. This folder-specific prompt may be received from a metadata management application that has obtained metadata configuration information from a metadata configuration file (MCF). The display prompt content may then be displayed 182 on the IDev UI.

In response to the metadata prompt content being displayed on the UI display, the IDev may receive 183 metadata input at the UI. In some embodiments, the IDev UI may also generate 184 a data file, such as a scanned image file. The IDev may then send 185 the data file to a metadata manager application. The metadata input received from the IDev UI may also be sent 186 to the metadata manager application for association with the data file and eventual storage.

Figure 17:
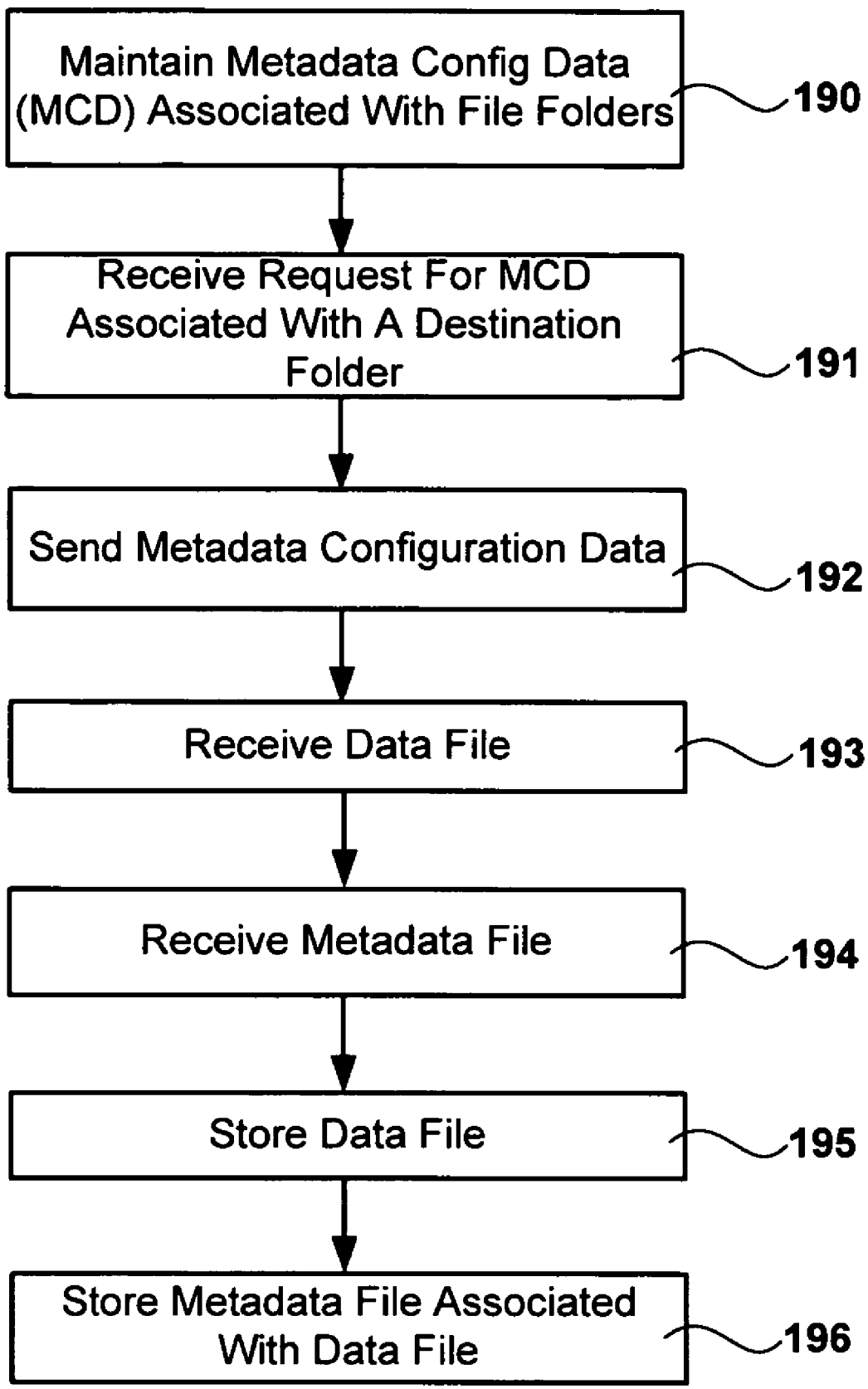
FIG. 17 is a chart showing steps of an embodiment comprising a file management system maintaining a metadata configuration file that is associated with file folders in the system.

Some embodiments of the present invention may be described with reference to FIG. 17. In these embodiments, a file manager, such as a Document Management System (DMS), an Operating System (OS) or some other file management system, may maintain 190 a metadata configuration file (MCF) that is associated with file folders in the system. The system may comprise individual MCFs for each folder or specific groups of folders or the system may comprise on master MCF with data related to each folder in the system. A file manager may receive 191 a request for MCF data associated with a particular destination folder. When this occurs, the file manager may send 192 an MCF or MCF data to the requesting application. The requesting application may be a metadata manager application that receives metadata from an IDev. The file manager may then receive 193 a data file as well as a metadata file 194 that is associated with the data file. These files may then be stored by the file manager 195, 196. In some embodiments, the data file and associated metadata file may be stored in the destination folder with file names comprising a common element.

Figure 18:
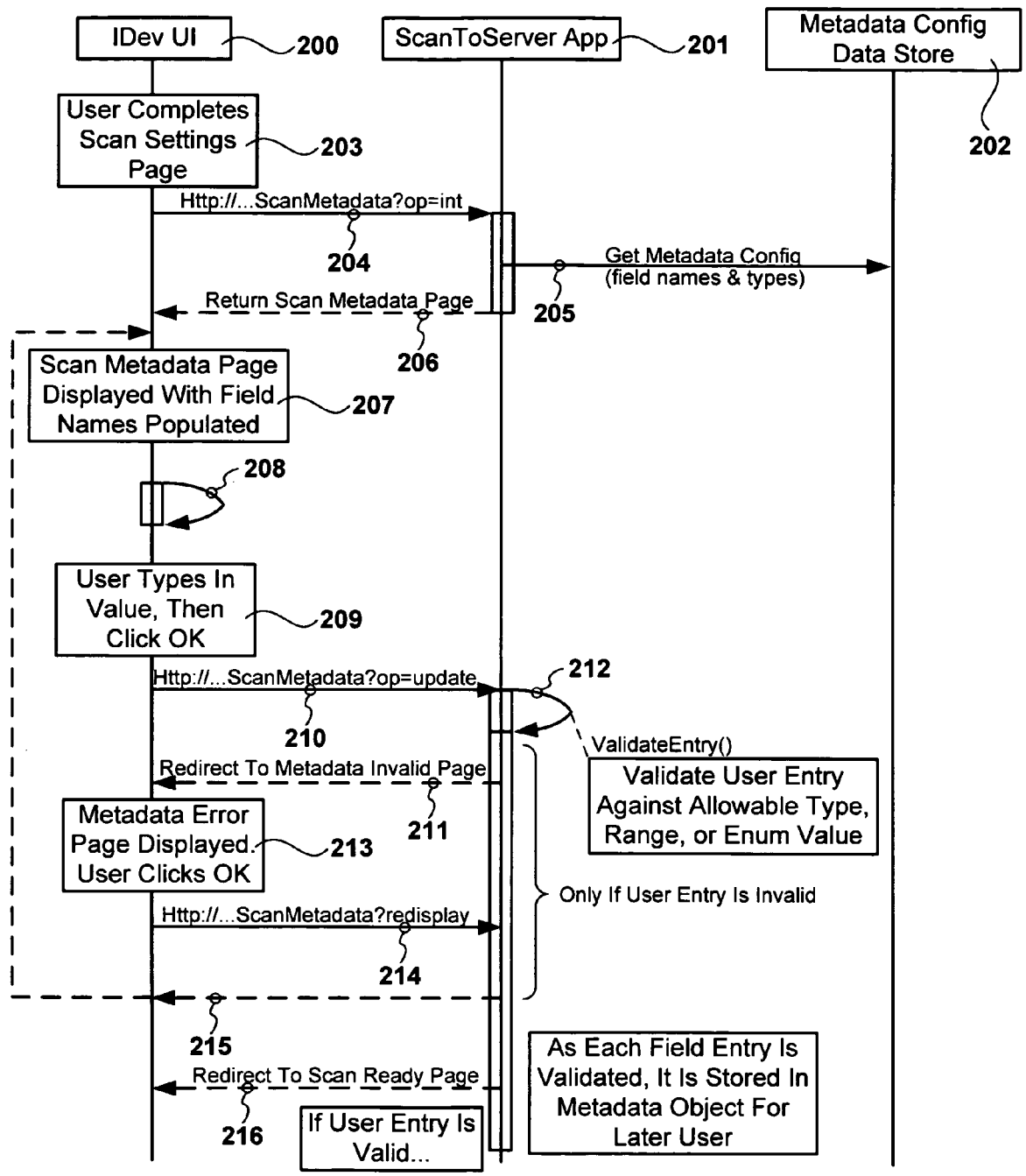
FIG. 18 is a diagram showing steps of an embodiment comprising metadata entry and validation in a scan-to-server application.

Some embodiments of the present invention may be described with reference to FIG. 18. In these exemplary embodiments, a scan-to-server function is implemented. A user may initiate the process by entering scan job selections 203 at an IDev UI 200. These selections may comprise scanner settings, a scan job destination folder and other scan job parameters. This scan job data is sent 204 to a remote scan-to-server application 201. The scan-to-server application may then identify the destination directory and request 205 metadata configuration data from a metadata configuration data store 202. The metadata configuration data may then be used to generate display content for prompting a user for metadata input. This display content may then be sent 206 to the IDev for display to a user. A metadata input prompt 207 is then displayed to a user, who may respond by inputting metadata. This input may be performed via a soft keyboard 208 or enumerated options page. The input may also be typed 209 when a keyboard is available.

As each metadata entry is received, the entry is sent 210 to the scan-to-server application for validation 212. Each entry may be validated against an allowable type, range, enumerated value or some other parameter. If an entry is invalid, an invalid metadata page 211, 213 may be displayed to the user. A user may then be prompted to re-input the entry. This may be achieved with a request 214 from the IDev for prompt data and a response by the scan-to-server application resending 216 the metadata prompt content.

If the metadata input validation is successful, a scan ready page 216 may be sent to the IDev UI to indicate to a user that input was successful. As each metadata entry is successfully validated, the entry may be stored in a metadata object for later use. When the scan job is complete, the metadata may be saved in a file that is associated with the scan job file thereby linking the metadata to the scan job file.

Figure 19A:
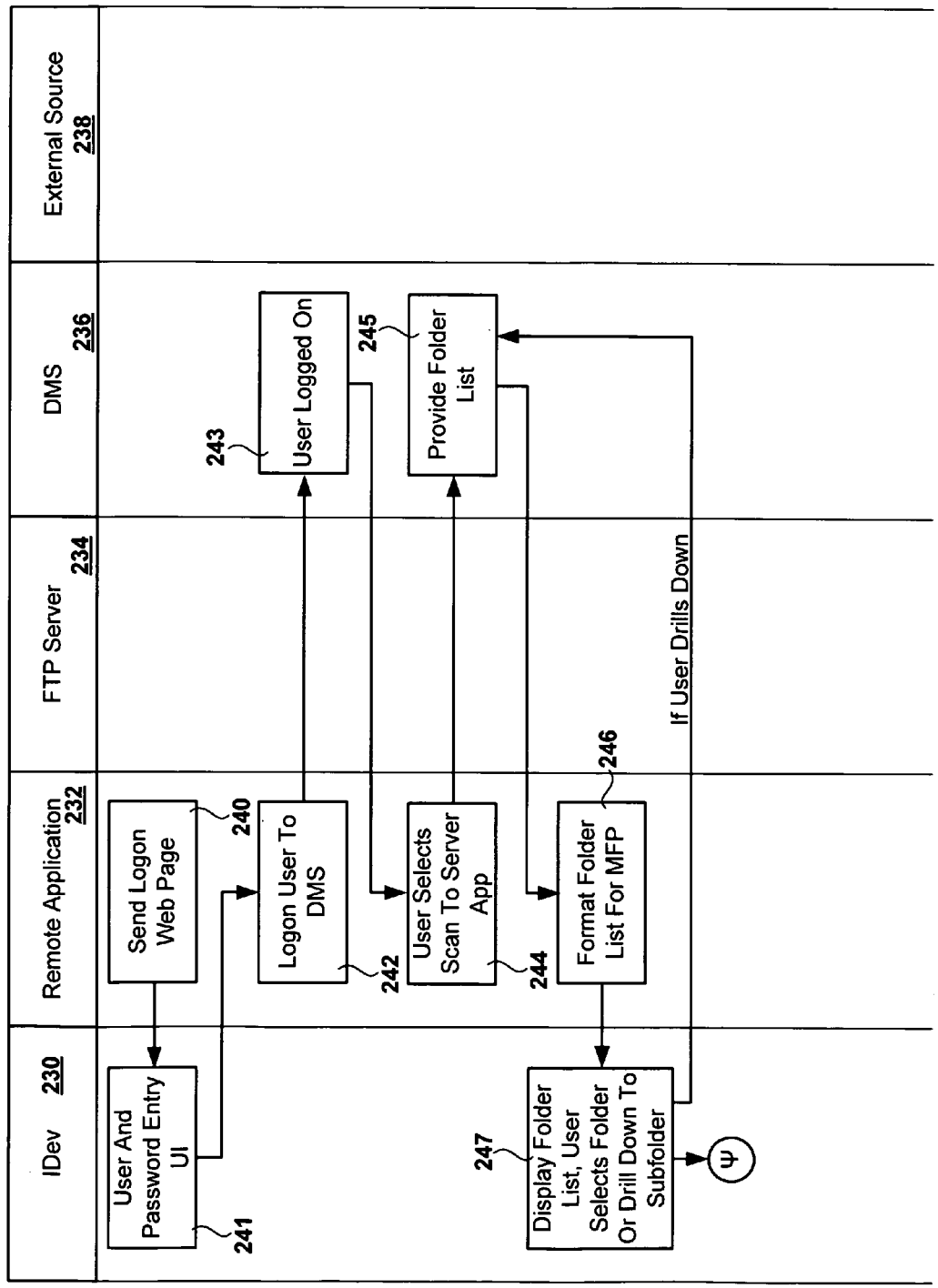
FIG. 19 is a diagram showing steps of an embodiment comprising an imaging device, a remote application, an FTP server, a Document Management System and an external source.
Figure 19B:
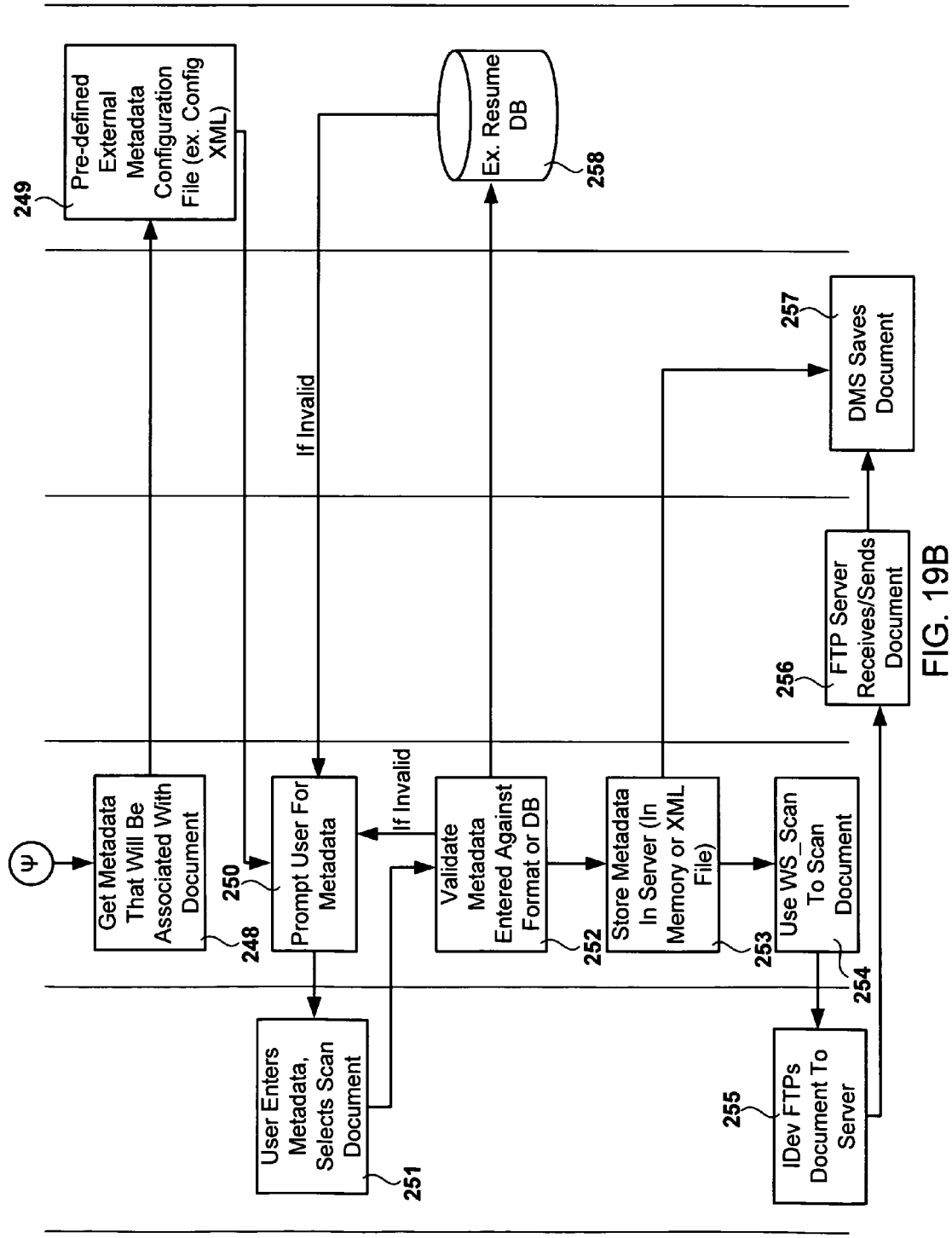

Some embodiments of the present invention may be described with reference to FIGS. 19A & 19B. These embodiments comprise an IDev 230, an ASP.NET remote application 232, an FTP server 234, a Document Management System (DMS) 236 and an external source 238. In these embodiments a remote application 232 may send 240 a logon page to an IDev for display at the IDev UI. The IDev UI may then receive 241 user input in response to the logon page. This input may be sent to the application 232 and forwarded 242 to the DMS 236 for access. When a user has logged 243 into the DMS 236, a user may select a scan-to-server function 244 from the application 232. Since the user will need to specify a destination file folder, the system will request a folder list 245 from the DMS 236. This list may be sent to the application where it may be formatted 246 for IDev display and passed to the IDev 230.

This folder list may then be displayed 247 and user input may be received in response. If a user makes a selection to drill down to another file folder layer, the DMS 236 may provide additional file folder data until the desired level is attained. Once the destination folder has been selected, the application 232 may request 248 metadata configuration data to be associated with the scanned image file. To achieve this, the application 232 may request 248 metadata configuration data from an external source 238 with a metadata configuration file 249. This metadata configuration data may be sent to the application 232 and used to generate display prompts 250 for IDev UI display. These prompts may be sent to the IDev and displayed to a user.

In response to the prompts, a user may enter 251 metadata entries. These entries may be sent to the application 232 and validated 252 against pre-defined parameters, such as in a database 258. If the entry is successfully validated, the entry may be stored 253 in memory, on a server or in some other manner. If an entry is not successfully validated, a user may be re-prompted 250 for that information.

After successful metadata entry and validation, the scan process 254 may be implemented. The application may use a web service to accomplish the actual scan on the IDev. When the scan is complete 255, the image file may be sent by FTP to an FTP server 234. The FTP server may then send 256 the image file to a DMS 236 for storage 257 in a format that is associated with the metadata entry, which is also sent to the DMS.

Some embodiments of the present invention may work in conjunction with a Document Management System (DMS), such as Microsoft SharePoint. In these embodiments, a metadata manager application may access metadata configuration data (MCD) from a DMS library, e.g., SharePoint Library, which may comprise metadata configuration data for each file in the library. The configuration data may then be used to determine what data needs to be input by a user in conjunction with file creation and storage. This information may then be used to populate display content for prompting a user to input the required data. These prompts may be sent to an IDev display and, in response, user input may be received that identifies the required metadata. Once received, the metadata input may be formatted according to the MCD and sent to the DMS for storage and relation to the associated data file.

In some embodiments of the present invention metadata configuration data (MCD) may be stored in a metadata configuration file (MCF). In other embodiments, such as some which use a DMS, MCD may be stored in a database or some other data structure. Accordingly, the scope of the term MCD includes any MCF.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for imaging device file metadata management, said method comprising:
    a) retrieving a metadata configuration file (MCF) that is associated with a file folder, wherein said MCF comprises parameters for creating a metadata file associated with a data file in said file folder, and wherein said retrieving is performed with a processor and a memory;
    b) identifying at least one metadata parameter with said MCF;
    c) sending user prompt data to an IDev for prompting a user for metadata input that conforms to said metadata parameter;
    d) receiving said metadata input from said IDev; and
    e) storing said metadata input as a metadata file in said file folder, wherein said metadata file conforms to said parameters in said MCF and wherein said storing comprises storing said metadata input as a file in said destination folder and storing said associated data file in said destination folder and wherein said data file and said metadata file share a common file name element.

2. A method as described in claim 1 further comprising receiving a file folder selection identifying said file folder.

3. A method as described in claim 1 further comprising correlating said metadata file with another file.

4. A method as described in claim 1 wherein said user prompt data comprises markup language content configured for an IDev UI display.

5. A method as described in claim 1 wherein said identifying comprises populating a metadata class object with field data from said MCF.

6. A method as described in claim 1 further comprising storing said metadata input as an ASP.NET session object.

7. A method for imaging device file metadata management, said method comprising:
   a) receiving a selection of a destination file folder for storing a data file;
   b) retrieving a metadata configuration file (MCF) associated with said destination file folder, wherein said MCF comprises parameters for creating a metadata file for each file in said file folder, and wherein said retrieving is performed using a processor and a memory;
   c) identifying at least one metadata parameter with said MCF;
   d) sending user prompt data to an IDev for prompting a user for metadata input that conforms to said metadata parameter;
   e) receiving said metadata input from said IDev;
   I) storing said data file in said destination file folder;
   g) associating said metadata input with said data file, wherein said metadata input is stored according to said parameters in said MCF; and
   h) wherein said associating said metadata input with said data file comprises storing said metadata input as a file in said destination folder and storing said data file in said destination folder and wherein said data file and said metadata file share a common file name element.

8. A method as described in claim 7 wherein said receiving a selection of a destination file folder comes from said IDev.

9. A method as described in claim 7 wherein said retrieving an MCF comprises retrieving a file from a remote storage device.

10. A method as described in claim 7 wherein said sending user prompt data comprises sending a metadata class object populated with field data from said MCF to said IDev.

11. A method as described in claim 7 further comprising receiving said data file from said IDev.

12. A method as described in claim 7 further comprising converting said metadata input to a markup language format.

13. A method as described in claim 7 wherein said storing said data file comprises sending said data file to a remote storage device using a file transfer protocol.

14. A system for imaging device file metadata management, said system comprising:
   a) an MCF retriever for retrieving a metadata configuration file (MCF) from a file folder to which said MCF is associated, wherein said MCF comprises metadata parameters for creating a metadata file for each file in said file folder, and wherein said retriever comprises a processor and a memory;
   b) an MCF reader for reading said MCF to identify at least one metadata parameter in said MCF;
   c) a prompt sender for sending user prompt data to an IDev for prompting a user for metadata input that conforms to said metadata parameter;
   d) a metadata receiver for receiving said metadata input from said IDev; and
   e) an associator for storing said metadata input as a metadata file and associating said metadata file with a data file destined to be stored in said file folder wherein said associating comprises naming said data file and said metadata file with a common file name element.

15. A system as described in claim 14 wherein said system further comprises a folder selection receiver for receiving a selection identifying said file folder.

16. A system as described in claim 14 wherein said system further comprises a metadata validator for validating said metadata input.

17. A system as described in claim 14 wherein said IDev farther comprises an IDev interface for initiating an IDev function.

\* \* \* \* \*